United States Patent [19]

Beierle

[11] Patent Number: 5,200,996
[45] Date of Patent: Apr. 6, 1993

[54] STATION CONTROLLER FOR MULTI-LINE PICK-UP AND AUTOMATIC MONITORING OF TELEPHONE STATION MOVES

[75] Inventor: John D. Beierle, Danbury, Conn.

[73] Assignee: Nynex Corporation, New York, N.Y.

[21] Appl. No.: 670,024

[22] Filed: Mar. 15, 1991

[51] Int. Cl.$^5$ .................. H04M 3/22; H04M 3/58; H04Q 3/60; H04Q 11/04
[52] U.S. Cl. .................................. 379/212; 379/210; 379/231; 379/384; 379/396; 370/110.1
[58] Field of Search ............... 379/210, 207, 201, 221, 379/229, 94, 214, 383, 384, 396, 212, 231; 370/60.1, 110.1

[56] References Cited

U.S. PATENT DOCUMENTS

| | | | |
|---|---|---|---|
| 4,755,985 | 7/1988 | Jayapalan et al. | 379/94 X |
| 4,885,769 | 12/1989 | Beierle | 379/210 |
| 5,027,341 | 6/1991 | Jarvis et al. | 370/13 |

*Primary Examiner*—Thomas W. Brown
*Attorney, Agent, or Firm*—Loren Swingle; John J. Torrente

[57] ABSTRACT

A station controller for use with a centrex exchange in which the controller provides lamping signal control for the lamps of telephone stations forming multi-station pick-up groups and wherein the controller further provides cable pair information for use in establishing and updating an equipment port/cable pair/telephone station correlation table in the centrex exchange.

42 Claims, 4 Drawing Sheets

STATION CONTROLLER FOR MULTI-LINE PICK-UP AND AUTOMATIC MONITORING OF TELEPHONE STATION MOVES

BACKGROUND OF THE INVENTION

This invention relates to station controller units and, in particular, to station controller units used with centrex exchanges for permitting the exchanges to more easily accommodate a multi-station pick-up capability.

U.S. Pat. No. 4,885,769, assigned to the same assignee hereof, describes a telephone system in which a number of station controller units each associated with a number of telephone stations, are interposed between their respective telephone stations and a centrex exchange. Each controller unit communicates with the cable pairs connected to its associated telephone stations. These cable pairs, in turn, are connected to specific equipment ports of the centrex exchange.

As described in the '769 patent, each station controller unit is adapted to couple control, voice and data information between its associated telephone stations and the centrex exchange. Where the telephone stations are digital telephone stations operating on the Integrated Systems Digital Network (ISDN) standard, this coupling is through a control channel, the so-called "D channel" and through two other channels, the so-called "B channels", one for voice signals and the other for data signals. This communication furthermore is in packet form with information packets being continuously passed between the controller and the telephone stations.

The station controller units of the '769 patent are further adapted to provide signals for controlling the lamps of the telephone stations of the system which are arranged in so-called multi-station pick-up groups. Each multi-station pick-up group defines a set of stations each of which can pick-up for every other station in the group. To permit this pick-up capability, each station of a multi-station pick-up group is provided with lamps corresponding to the other stations of the group to indicate the status of these other stations.

As described in the '769 patent, each station controller unit monitors the status (off-hook, ringing, etc.) of each associated telephone station via the respective D channel and in response to a status change places a status control signal on a local area network which connects all the station controller units. Each station controller unit upon receipt of a status control signal on the local area network processes the status control signal through a map which correlates each telephone station served by the controller with the other stations in its pick-up group.

If a status control signal is in a pick-up group of one or more of the stations served by a controller, the controller then provides signals over its D channels to the appropriate telephone stations. These stations, in turn, change the conditions of their appropriate lamps to reflect the changed status.

The station controller units and the local area network in the '769 patent thus permit the centrex exchange to have a multi-station pick-up capability, while relieving the centrex of having to provide the lamp status control signals for the telephone stations. Moreover, connection of a picking-up telephone is still carried out by the centrex exchange itself. This occurs via a pick-up signal actuated by a pick-up key on the picking-up telephone station.

The pick-up signal is conveyed by the appropriate station controller to the centrex exchange and processed by the exchange via a multi-station pick-up group map. The latter allows the exchange to correlate a telephone station being rung with pick-up signals from other stations in the rung telephone station's pick-up group. Upon receipt of a pick-up signal, the centrex establishes a virtual connection to the picking-up telephone station so that the call can be answered.

The station controller units of the '769 patent, therefore, need no switching capability and thus can be of simpler construction. Moreover, with these controllers, telephone stations served by different controllers can be in the same pick-up group.

While the station controller units and system of the '769 patent are thus advantageous, there is also a desire in systems of this type to be able to move a telephone station from one cable pair to another in the system without changing the directory number of the station and class of service being provided to the station. This permits a subscriber to move from one location to another in the system without affecting the subscriber's telephone service.

In many centrex systems, this is accomplished by a change order being written which updates the cable pair information for the telephone station being moved. This cable information includes the directory number (i.e., identity) of the telephone station being moved and the identity of the old and new cable pairs.

The written change order is then conveyed to a recent change maintenance and administrative center where it is electrically transmitted to the centrex exchange through its so-called "recent change port". Cable information received at this port is used by the exchange to establish and update a correlation or translation table which is maintained by the centrex exchange to correlate the equipment ports of the exchange with the associated cable pairs and with the directory numbers (identities) of the telephone stations served by the cable pairs.

When cable information is received by the centrex exchange indicating a directory number (i.e., identity) of a telephone station and the old and new cable pairs, the correlation table is appropriately changed, deleting the directory number from the old cable pair entry and entering it onto the new cable entry. The centrex now correlates the directory number and its telephone station with the new cable pair and, in particular, with the centrex equipment port connected to that cable pair.

Their are some centrex changes (e.g., the No. 5 ESS) in which the aforesaid change in cable pair can be processed automatically by the centrex exchange during initial connection of the telephone station to the new cable pair. Additionally, station controller units which have a switching capability can also accomplish this via their switching circuitry.

However, many centrex exchanges do not have this automatic capability and have to use the written change order procedure discussed above. Also, station controller units using switching circuitry are not as desirable as units, such as the '769 controller unit, which do not require such circuitry. It, therefore, would be beneficial to accomplish automatic processing of telephone station moves to new cable pairs with a station controller unit that does not require the use of switching equipment.

It is, therefore, a primary object of the present invention to provide a station controller unit not having a switching network for use in providing a multi-station pick-up capability to a centrex exchange and which also permits the automatic monitoring of the movement of a telephone station from one cable pair to another.

It is a further object of the present invention to adapt the station controller unit of the '769 patent to achieve the aforementioned objective.

SUMMARY OF THE INVENTION

In accordance with the principles of the present invention, the above and other objectives are realized in a telephone system employing a centrex exchange having multi-station pick-up groups wherein a station controller means as described in the '769 patent provides control of the lamps of the secondary stations (i.e., those able to pick-up for a station being rung) of each pick-up group, and wherein the centrex exchange provides control of the call transfer from the primary stations (i.e., the stations being rung) of each pick-up group to the respective secondary stations of the group. The station controller means is interposed between the telephone stations of the pick-up groups and the centrex exchange and communicates with the cable pairs connected to these stations. The cable pairs, in turn, are connected to associated equipment ports of the centrex exchange which contains a table means for correlating each cable port with an associated cable pair and its corresponding cable pair information (i.e., cable pair number, whether or not cable pair is connected to a telephone station and, if so, the identification number of the station).

The station controller means further monitors for each cable pair, the aforesaid cable pair information. This information is then communicated by the station controller means to the centrex exchange for establishing and updating the aforesaid correlation table. By causing the station controller to monitor the cable pair information, this information can be updated automatically so that telephone stations can now be moved from cable pair to cable pair (i.e., one location to another) simply and easily. Moreover, this automatic monitoring can be accomplished without the use of switching equipment at the station controller means. An overall more advantageous system thereby results.

As in the '769 patent, the station controller means can comprise a plurality of modular station controller units each of which is assigned a set of stations and each of which monitors the status of its stations and reports a change in status to a broadcast system or local area network. The latter provides communication amongst the controllers so that the status of the stations monitored by each controller is made available to that controller as well as to the other controllers in the system.

In accord with the invention, each station controller also monitors the cable pair information of the cable pairs to which its associated telephone stations are connected and communicates this cable pair information over the local area network to an administrative processor. The later establishes and updates its own table of cable pair information and communicates this information to the recent change port of the centrex exchange for establishing and updating the correlation table of the exchange.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1A:
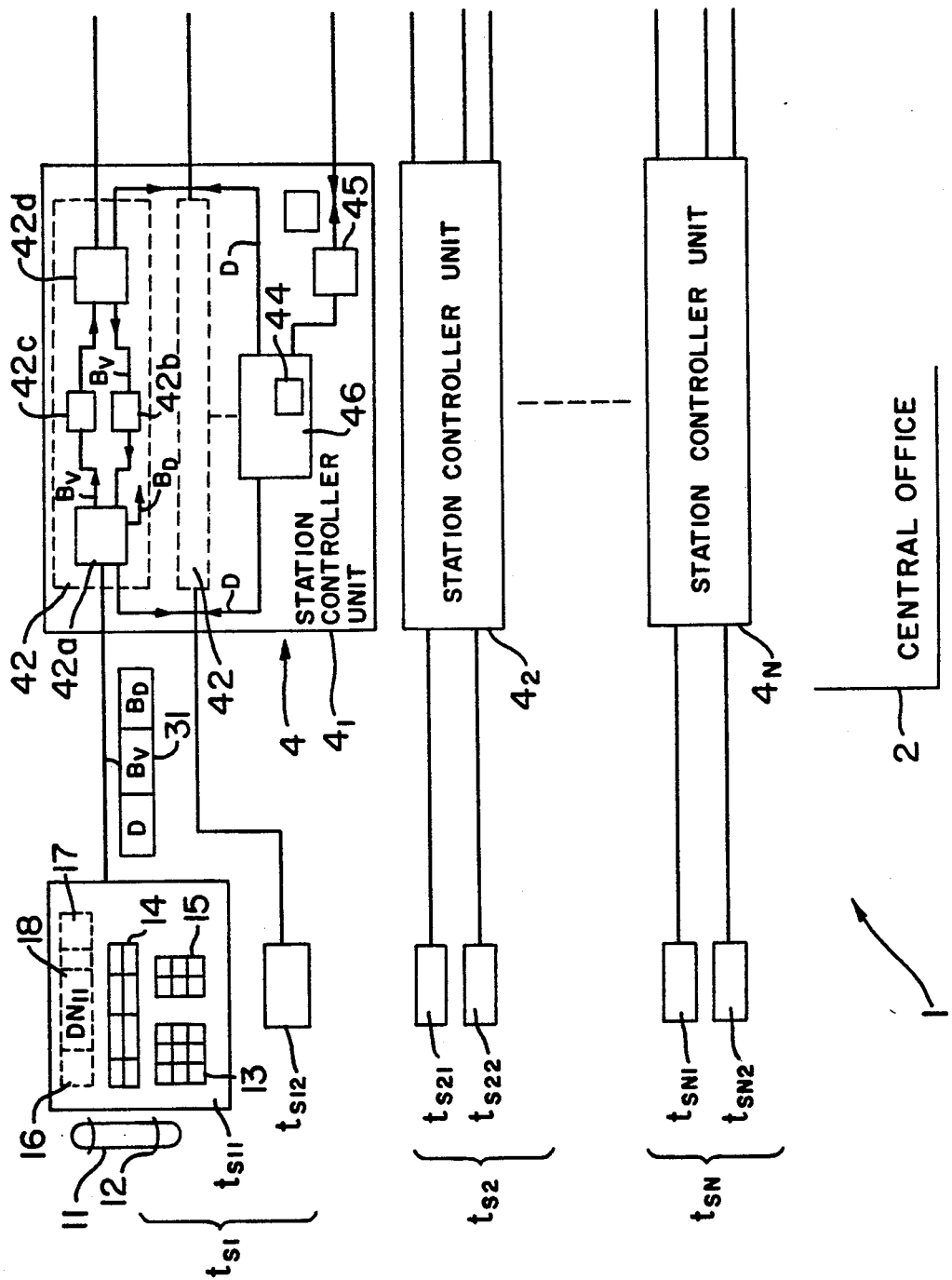
FIGS. 1A and 1B together show a telephone system in accordance with the principles of the present invention.
Figure 1B:
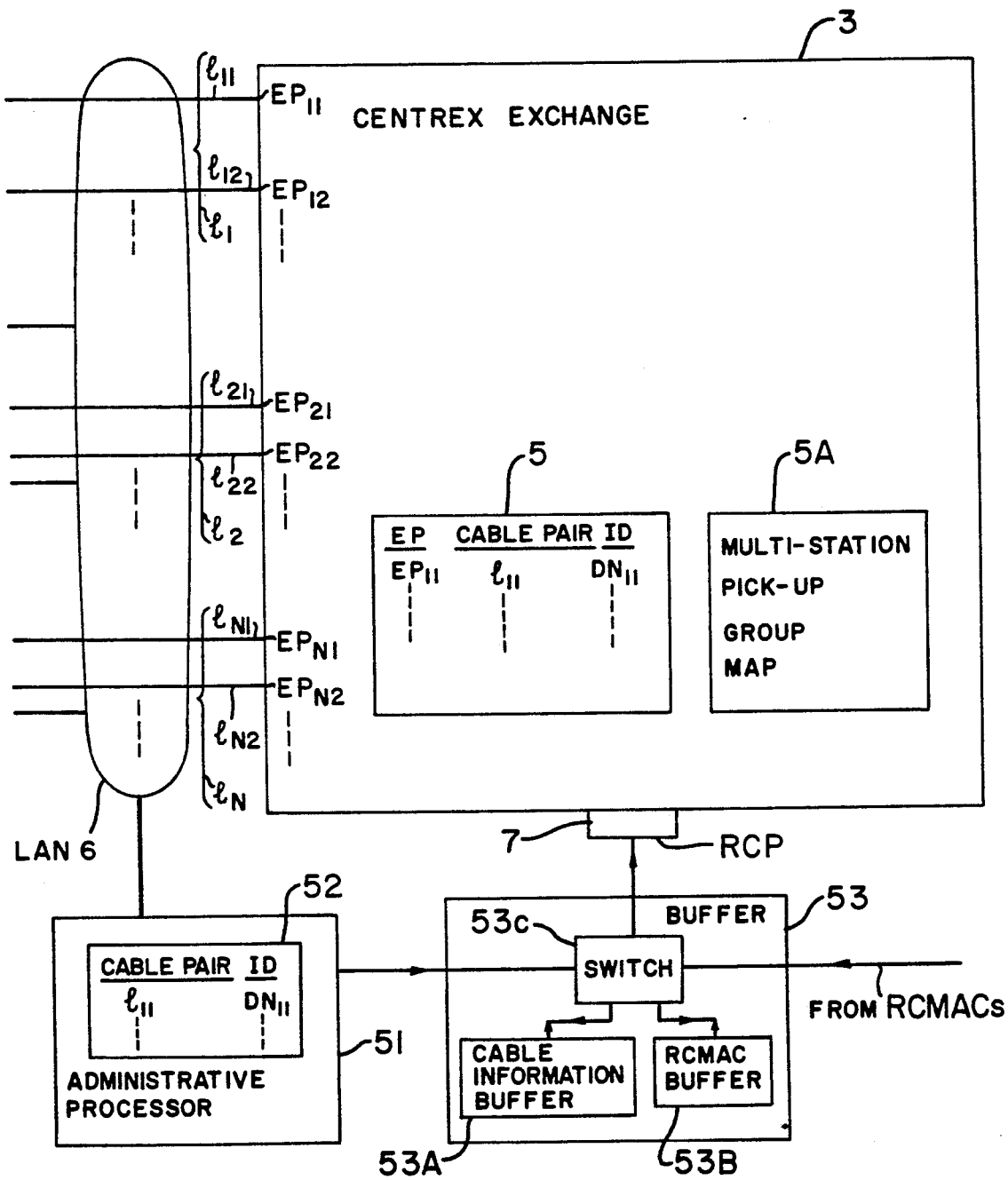

FIGS. 1A and 1B together show a telephone system 1 in accordance with the principles of the present invention. The system 1 comprises a central office 2 which houses a centrex exchange 3. The latter exchange 3 is an electronic switching system or memory driven exchange.

The centrex exchange 3 manages telephone calls to a plurality of telephone stations which are grouped into N groups $ts_1$ to $ts_N$ of n stations $ts_{11}$ to $ts_{1n}$, $ts_{21}$ to $ts_{2n}$ ... and $ts_{N1}$ to $ts_{Nn}$. For the purposes of the present discussion, each of the telephone stations in the groups $ts_1$ to $ts_N$ is assumed to be a digital station under microprocessor control.

Station $ts_{11}$ is a representative station. As shown, the station includes a handset 11, a switchook 12, a key pad 13 for dialing, a lamp set 14 for indicating station status, a ringer 17 and a function key set 15 for keying specified functions. These elements all interact with the station microprocessor 16 to provide information flow to and from the station.

Based upon the Integrated Systems Digital Network (ISDN) standard, this flow of information is in terms of message units or packets 31. As can be seen, each packet 31 includes a D channel (usually 16 Kb/sec) for telephone network control and two B channels (usually 64 Kb/sec), one for voice information $B_v$ and the other for data information $B_D$.

The packets 31 are continuously transmitted from and received by each station $t_s$ through the respective microprocessor 16. In the particular case of control information, operation of the switchook and keying of the pad 13 and keys 15 of the station causes the microprocessor 16 to develop D channel digital control information for transmission from the station via the station packets. Conversely, D channel digital control information in a received packet is converted by the microprocessor 16 into signals for actuating the lamp set 14 and the ringer 17 of the station.

The groups of stations $ts_1$ to $ts_N$ are linked to the centrex exchange 3 by corresponding groups of telephone links $l_1$ to $l_N$ comprising cable pairs $l_{11}$ to $l_{1n}$, $l_{21}$ to $l_{2n}$ ... and $l_{N1}$ to $l_{Nn}$. Each cable pair $l_{11}$ to $l_{Nn}$ connects to a corresponding equipment port $EP_{11}$ to $EP_{Nn}$ of the centrex exchange. To provide for proper processing of calls, the centrex exchange 3 includes a correlation or translation map or table 5 which correlates equipment ports EPs with associated cable pairs and cable pair information. The latter information is shown in FIG. 1 a including the identification number (shown as the directory number DN) of the telephone station connected to the corresponding cable pair.

For establishing and updating the table 5, the centrex exchange 3 also includes a recent change port RCP 7. The latter port receives initial and changed cable information and this information is processed by the exchange to establish and update the table 5. Thus, if station $ts_{11}$ with directory number $DN_{11}$ were moved from its present cable pair $l_{11}$ to another cable pair connected to the same controller, e.g., cable pair $l_{14}$, or to another controller, e.g., $l_{24}$, the recent change port would receive this information and the centrex would change the table 5 entries accordingly. This will be discussed in greater detail below.

It is assumed for present purposes that centrex 3 does not have the capability to automatically monitor initial and changed cable pair information to establish and update its table 5 by directly communicating with the telephone stations. Thus, the centrex may be a NTT DMS 100 digital exchange or analog exchanges such as AT&T's No. 1 ESS or No 1A ESS. It should be noted, however, that the system of the invention may be used with centrex exchanges that have this automatic capability, such as, for example AT&T's No. 5 ESS as a redundant or back-up mechanism.

Interposed between the station groups and the centrex 3 at the central office is a station controller 4. The controller 4 communicates with the cable pairs $l_{11}$ to $l_{Nn}$ and includes N modular station controller units $4_1$ to $4_N$. These units control the transmission between the respective station groups $ts_1$ to $ts_N$ and the centrex 3.

Each of the station controllers $4_1$ to $4_N$ is also microprocessor controlled. Station controller $4_1$ is an illustrative controller. The controller 41 includes for each of its stations, a controller link 42. Each of the links 42 is of like construction and, as a result, only one link has been actually illustrated. As shown, each link includes a station interface circuit 42a, an A/D converter 42b, a D/A converter 42c and a centrex interface 42d.

The links 42 of the station controller 41 all communicate with a common microprocessor 46. The microprocessor 46 controls the activity of all links 42 and it does so similarly for each link. In particular, the station interface circuit 42a in each controller link 42 receives information packets from the corresponding telephone station and retrieves from each packet the voice, data and control information channels $B_v$, $B_D$ and D. The separated D channel digital control information is then coupled by the interface to the microprocessor 46. The microprocessor 46 converts this information into D channel dial pulse or tone, i.e. POTS, control signals, by control of dial pulse or tone generating circuitry at the centrex interface 42d of the link. The resultant D channel POTS signals are then coupled from the interface 42d to the centrex 3.

The $B_v$ channel digital voice information is also coupled through the interface 42d of the link and delivered to the centrex. This occurs after the $B_v$ channel information is first converted to analog voice information by D/A converter 42c. The $B_D$ channel digital data, in turn, may be treated in a number of ways at the link. Thus, for example, it may be treated similarly to the $B_v$ voice channel information by converting it to analog data and then coupling the analog data to the centrex via the interface 42d. It may also be coupled directly to digital channels at the centrex.

Analog information coming from the centrex 3 to a link 42 of a station controller 41 is likewise separated into individual channels at the centrex interface 42d. Thus, the D channel POTS signals, the $B_v$ channel analog voice information and the $B_D$ data (if any) are separated at the interface. The D channel POTS signal is then sensed by the microprocessor 46 which generates corresponding D channel digital control information. The latter, in turn, is combined at the station interface 42a with $B_v$ channel digital voice information, which is developed by A/D converter 42b from the separated $B_v$ channel analog information, and with any $B_D$ channel digital data. The resultant combined channels in packet form are then transmitted to the associated telephone station.

The station controller units $4_1$ to $4_N$ and the centrex 3 are further adapted, as described in the '769 patent, whose teachings are incorporated herein by reference, to allow the system 1 to have one or more multi-station pick-up groups. An illustrative pick-up group might be the stations $ts_{11}$, $ts_{12}$, $ts_{21}$ and $ts_{N1}$, where the primary station of the group is $ts_{11}$ and the secondary stations $ts_{12}$, $ts_{21}$ and $ts_{N1}$. A second pick-up group might be stations $ts_{12}$, $ts_{11}$, $ts_{21}$ and $ts_{N1}$ for the primary station $ts_{12}$.

As described in the '769 patent, in order to accommodate the aforesaid multi-station pick-up groups in the system 1, the lamp sets 14 of the secondary telephone stations in the groups are used to identify the status of the respective primary stations. In the present case, individual lamps of the lamp set 14 at the station $ts_{11}$ thus identify the status of the stations $ts_{12}$, $ts_{21}$ and $ts_{N1}$. Similarly, individual lamps at the station $ts_{12}$, identify the status of the stations $ts_{11}$, $ts_{21}$ and $ts_{N1}$. In the depicted situation, the lamp sets 14 of these telephone stations also have individual lamps identifying the status of their own stations. Thus, stations $ts_{11}$, $ts_{12}$, etc. have lamps identifying their own status.

As further described in the '769 patent, the station controller units $4_1$ to $4_N$ are adapted to provide the necessary control for the lamp sets 14 of their respective stations and, in particular, for the aforesaid station identifying status lamps associated with the multi-station pick-up groups. To achieve this, the controllers $4_1$ to $4_N$ each provide lamp control signals to their respective stations. These lamp control signals are generated by the controller processors 46 based on the status conditions, e.g., ringing busy, etc., of the stations.

In order for each controller unit $4_1$ to $4_N$ to be able to control those lamps of its telephone stations which identify the status of primary stations served by other controller units (e.g., for controller $4_1$ to control the lamp $ts_{21}$ of station $ts_{11}$ identifying primary station $ts_{21}$), the status of these primary stations must be reported to the controller. As also described in the '769 patent, a broadcast or local area network (LAN) 6 is provided in the system 1 for this purpose.

The LAN 6 is coupled to each of the controller units $4_1$ to $4_N$ and allows the controllers to communicate with each other. In particular, signals developed by each controller $4_1$ to $4_N$ as to the status of their stations are coupled to the LAN 6 for circulation to each of the other controllers. These status signals ar then used by the controllers to develop the lamp control signals for the lamps of their stations associated with the status signals. Accordingly, each controller unit can now control the lamps of its stations which identify the status of primary stations not served by the controller.

As above-indicated, the controller units $4_1$ to $4_N$ each develop status signals indicative of the status of their respective stations. This is accomplished by the processor 46 of each controller unit recognizing a change status of a station from the D channel control information being fed through the processor from the associated processor link 42. Thus, for example, when the D channel control information from the station $ts_{11}$ indicates the station has gone off-hook, the processor 46 of the controller $4_1$ monitoring the associated link 42 recognizes this status change when it processes the D channel information. Once a processor 46 recognizes a change in status of a station, the processor generates a lamp control signal and a status signal indicative of the status of the station.

The lamp control signal is introduced by the processor 46 back into the digital D channel and transmitted via a packet to the station. The processor 16 at the station then recognizes the lamp control signal as indicative of a change in the status of the station and instructs the lamp indicative of station status to be set to the station condition. In the case of the station $ts_{11}$ going off hook, the lamp $ts_{11}$ would be turned full on.

The status signal generated by the processor 46 is, in turn, coupled to a LAN interface 45 at the controller. The LAN interface 45 then makes the status signal available to the LAN 6. Once a status signal has been placed on the LAN 6, it propagates along the network and is read on-the-fly by each controller unit, via its LAN interface 45. This includes the controller unit which introduced the signal which is the last to read it.

The read status signal is then coupled by each interface 45 to its respective processor 46 which then correlates the station identified by the status signal with the telephone stations served by the processor. By this correlation, the processor determines whether the identified station is a primary station for one or more of the processor secondary stations. This correlation is accomplished by providing a map 44 in each processor which permits the processor to correlate the secondary stations served by the processor, i.e., served by the associated controller unit, with their primary stations.

Having determined the stations which are to receive the status signal, each microprocessor 46 then introduces a lamp control signal into the digital D channel of each of the determined stations for setting the state of the lamp identifying the primary station associated with the status signal. Each D channel with the lamp control signal is then transmitted in packet form via the appropriate link 42 to the associated telephone station. The microprocessor 16 at the associated station then recognizes the lamp control signal in the D channel and causes the state of the corresponding lamp of the lamp set 14 to be suitably set. In this way, the lamps of all the secondary stations corresponding to the status signal and, therefore, the primary station, will have their status appropriately set.

As also described in the '769 patent, the LAN 6 is preferably a Cambridge ring type LAN which circulates the status signals in a conventional message or packet form and which utilizes source, as opposed to destination, removal of packets. The design of LAN's of this and other types is disclosed in the text Ring Technology Local Area Networks, edited by I. N. Dallas and E. B. Spratt and published by North-Holland in 1984, the teachings of which are incorporated herein by reference.

As can be appreciated from the above, the design of the station controller units $4_1$ and $4_N$ and of the the LAN 6, in accord with the '769 patent teachings, provides the multi-station pick-up groups of the system 1 with lamp control. This allows for considerable flexibility in selecting and changing of the pick-up groups. At the same time, it preserves the capacity of the centrex 3.

While this results in a highly advantageous system, the system has the added advantage of a reduced complexity of the controller units. This reduction in complexity is brought about by not requiring the controller units to perform the transfer or switching of calls from the primary to the secondary stations of the pick-up groups. Instead, as also described in detail in the '769 patent, such call transfer is effected at the centrex exchange 3, via its multi-station pick-up group map 5A, in response to actuation of pick-up keys 15 at the telephone stations.

While the station controller units $4_1$ to $4_N$ and the LAN 6 enable multi-station pick-up groups to be used with the centrex exchange 3 these units and the system 1 are further adapted, in accordance with the principles of the present invention, to allow for automatic communication of cable information to the centrex change 3 for establishing and updating its correlation table 5. To this end, each of the telephone stations $ts_{11}$ to $ts_{Nn}$, as above-indicated, has a unique identification number which in the present case, is the same as the directory number for the station. This number can be stored in the respective telephone station in a memory location 18 which is either a permanent memory area, so that the number cannot be changed, or alternatively, for greater flexibility, is a programmable memory area which permits the number to be changed, if desired.

Additionally, each of the station controllers $4_1$ to $4_N$ is further adapted, in accord with the invention, to monitor the identification numbers of the telephone stations connected to its associated cable pairs. Thus, controller $4_2$ monitors the identification numbers of the stations $ts_{11}$ to $ts_{1n}$ connected to the cable pairs $l_{12}$ to $l_{1n}$, respectively, controller 42 monitors the identification numbers of the stations $ts_{21}$ to $ts_{2n}$ connected to the cable pairs $l_{21}$ to $l_{2n}$, respectively, etc.

This monitoring is accomplished in each of the controllers via the microprocessor 46 of the controller inquiring through the D channel and the respective links 42 and cable pairs as to the stored identification numbers of the associated telephone stations. If a cable pair served by a controller has a connected telephone station, the telephone station will respond to this inquiry by reporting also over the D channel, respective link 42 and respective cable pair, the identification number in its storage area 18. If no telephone station is connected to a cable pair, there will be no response to the inquiry and this condition will be identified in the controller by an identification number, e.g., all O's, indicating that no telephone station is connected to that cable pair.

In order to communicate the aforesaid cable pair information being monitored and accumulated by the station controllers $4_1$ to $4_N$ to the centrex exchange 3, the system 1 is further adapted in accord with the invention to include an administrative processor 51 which develops and updates a composite cable pair information table 52 from the information being developed by the controllers. This table lists each cable pair of the system and the identification number of the current station connected to the cable pair or, if no telephone station is connected, the identification number indicating this status, e.g., all O's.

In further accord with the invention, cable pair information is transmitted from each of the controllers $4_1$ to $4_2$ to the administrative processor 51 over the LAN 6.

More particularly, upon a controller receiving a response or no response to a cable information inquiry, the controller places on the LAN 6 the cable information resulting from the inquiry (i.e., the cable pair identification number and the telephone station identification number or if no telephone station is present, the no connection identification number). When placed on the LAN, this cable information is addressed for receipt by the administrative processor 51.

The administrative processor, which is monitoring the LAN 6 for cable information, then retrieves the cable information sent by the controller. Based on the information, the processor 51, either establishes a new entry or updates a previous entry in its information table 52 for the identified cable pair. This procedure is carried out continuously as inquiries are made by the processors $4_1$ to $4_N$ and the resultant cable information is transmitted to administrative processor 51. As telephone stations are being connected and/or disconnected in the system 1, the table 52 of the processor 51 is thus continuously changed to reflect the changed conditions.

As initial entries are made by the administrative processor 51 or current entries are changed, the administrative processor communicates this initial or changed cable information to the recent change port RCP 7 of the centrex exchange 3. To avoid interference with cable information being simultaneously communicated to this port from recent change maintenance and administrative centers (RCMACS), a buffer device 53 is used to ensure the smooth flow of information into the port from these competing sources of information.

As shown, the buffer device 53 includes a cable information buffer 53A, an RCMAC buffer 53B and a switch 53C. The switch 53C receives the output of the administrative processor 51 and the output of the RCMACs and selectively couples these outputs to the RCP 7 or to the buffer 53A in the case of the processor 51 output or the buffer 53B in the case of the RCMACs output.

In particular, when the output of the RCMACs is connected by the switch 53C to the RCP 7, the switch also couples the buffer 53A to the output of the administrative processor 51. When the processor 51, in turn, is connected to the RCP 7 through the switch, the switch then likewise couples the output of the RCMACs to the buffer 53B.

When the transmission between either the administrator processor 51 or the RCMACs and the RCP 7 ceases, the switch 53C recognizes this. It then switches to the RCP 7 to the buffer which was in use during the immediately preceding transmission to communicate any information stored in the buffer.

The switch 53C can be a microprocesor controlled switch with intelligence. Switching can be based upon sensing appropriate sequences of data bits in the data streams being switched.

Once the cable information from the processor 51 is passed by the buffer 53 to the recent change port RCP 7, the centrex exchange 3 then uses this information to develop and update its equipment port correlation table 5, as above-described. In this way, initial and changed cable information of the system 1 is automatically transmitted and recorded by the centrex 3 using controller units which require no switching. As a result, telephone stations of subscribers can be moved from one cable (location) to another in the system 1, without affecting the class of service or changing the directory number of the subscriber. Telephone station moves are thus easily and readily accomplished.

Figure 2:
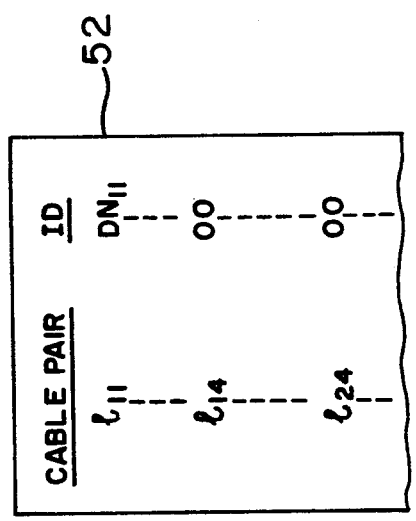

As an example of the above procedure, if we look at a partial illustration of the table 52 in FIG. 2, it shows cable pair $l_{11}$ connected to telephone station $ts_{11}$ and each of the cable pairs $l_{14}$ and $l_{24}$ as not connected to a telephone station. This is also reflected in the partial illustration of table 5 in FIG. 3.

Assume station $ts_{11}$ was now disconnected from cable pair $l_{11}$ and moved to either cable pair $l_{14}$ or $l_{24}$. As a result of disconnecting the telephone station, the next inquiry made by microprocessor 46 of controller $4_1$ over the cable pair $l_{11}$ would be met with no response due to the absence of the telephone station $ts_{11}$. As a result of this lack of response, the microprocessor 46 then places on the LAN 6 cable information including the identity of cable pair $l_{11}$ and the identification number 00 indicating that no telephone is connected to the cable pair. This information when received by the administrative processor 51 is used by the processor to update its table 51 and is also communicated by the processor to the centrex for updating the centrex table 5.

Depending upon where the station $ts_{11}$ is reconnected, either to cable pair $l_{14}$ or $l_{24}$, the controller serving the cable pair, in response to its next cable information inquiry with respect to the cable pair, would now receive a response indicating that the cable pair, either pair $l_{11}$ or $l_{24}$, as the case may be, is now connected to station $ts_{11}$ identified by directory number $DN_{11}$.

This information is then placed by the controller on the LAN 6 for transmission to the administrative processor 51. The processor 51 upon receipt of the information then updates its table 52 with respect to the appropriate cable pair and communicates the changed cable information to the centrex 3. The centrex 3 likewise update its table 5 with the changed information.

Figure 3:
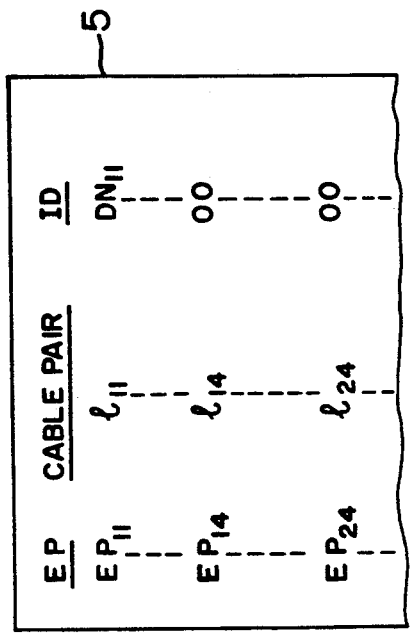
FIGS. 2 and 3 show cable information and correlation tables for the administrative processor and centrex exchange of FIG. 1.
Figure 5:
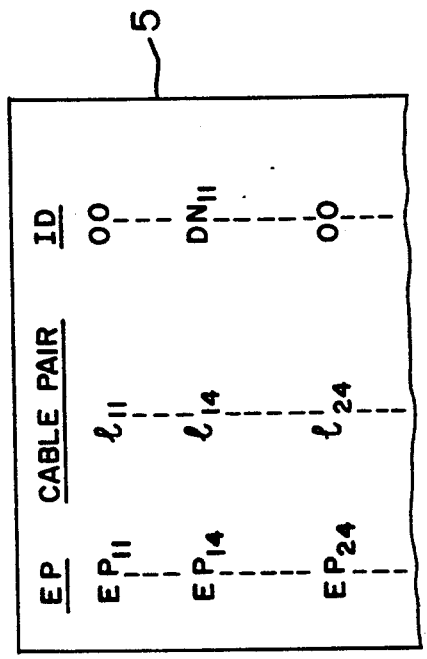
FIGS. 4 and 5 show modified cable information and correlation tables for the administrative processor and centrex exchange of FIG. 1 and FIGS. 6 and 7 show further modified cable information and correlation tables for the administrative processor and centrex exchange of FIG. 1.
Figure 4:
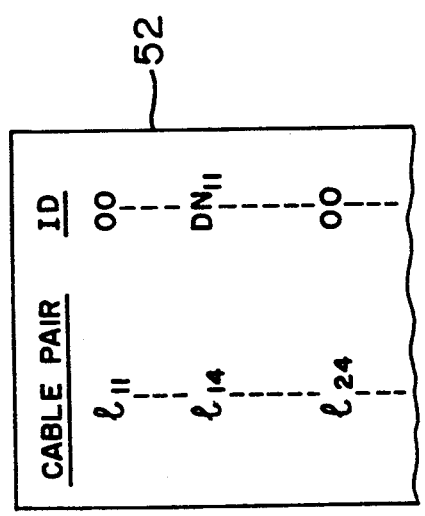
Figure 7:
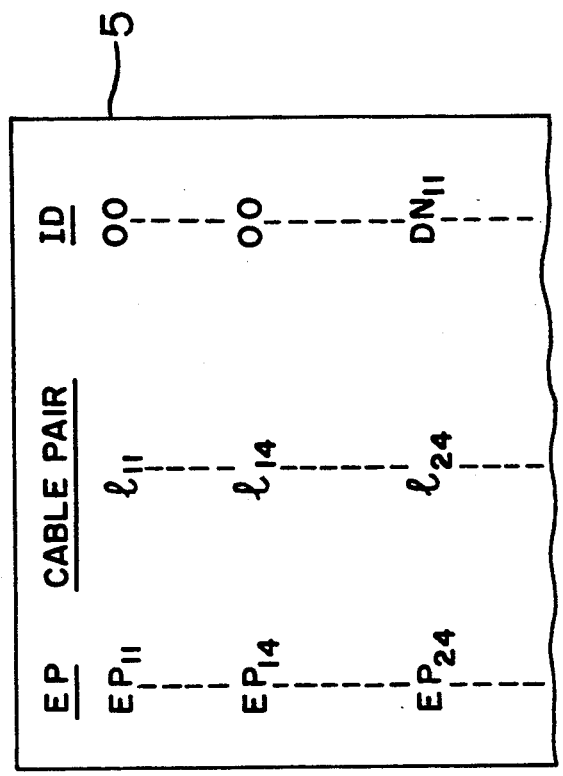
Figure 6:
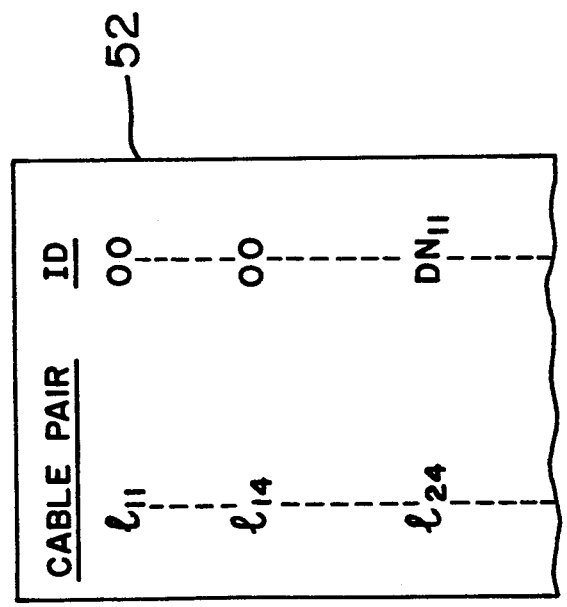

If the station $ts_{11}$ were moved to the cable pair $l_{14}$, the resultant partial tables 52 and 5 of FIGS. 2 and 3 would be changed to those shown FIGS. 4 and 5. If the move was instead made to cable pair $l_{24}$, the resultant tables 52 and 5 would be as shown in FIGS. 6 and 7. In each case, the cable $l_{11}$ is shown as unconnected. In the former case, the cable pair $l_{24}$ is also shown as unconnected, while the cable pair $l_{14}$ is shown as connected to the telephone station $ts_{11}$ which is identified by directory number $DN_{11}$. In the latter case, the cable pair $l_{14}$ remains unconnected and the cable pair $l_{24}$ is shown as connected to the station $ts_{11}$.

It should be noted that the movement of a telephone station between cable pairs served by different controllers $4_1$ to $4_N$ will also require that the correlation tables 44 of the controllers be changed to reflect this movement. Thus, the controller from which a telephone stations is moved, would have the station removed from entries on its map 44, while the controller to which the station were moved would have the station placed in entries on its map.

While the above description has illustrated the invention using digital telephone stations and signaling, the principles of the invention are intended to cover analog stations and analog signaling as well.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A telephone system comprising:
a plurality of telephone stations including one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group, each telephone station further having an identification number;
a plurality of cable pairs, each cable pair being adapted to connect the telephone station connected to the cable pair to an associated equipment port on a centrex exchange;
a centrex exchange for managing the flow of telephone calls to and from said telephone stations, said centrex exchange being responsive to the pick-up signal generated by each secondary station of a pick-up group and including means for transferring a call from a primary station in a pick-up group to a secondary station in the pick-up group in response to a pick-up signal from the secondary station, said centrex exchange further having a plurality of equipment ports each connected to an associated one of said cable pairs and table means within said centrex exchange for correlating each equipment port with the associated cable pair and with cable pair information corresponding to the associated cable pair, said cable pair information including the cable pair number, whether or not the associated cable pair is connected to a telephone station and, if so, the identification number of the telephone station;
and station controller means connected to said plurality of cable pairs and interposed between said telephone stations and said centrex exchange, said station controller means monitoring the status of the primary station of each pick-up group and generating a signal for controlling the state of the lamp means in each of the secondary stations of the pick-up group in dependence on the monitored status of the primary station of the pick-up group, said station controller means further monitoring for each cable pair said cable pair information and communicating the monitored cable pair information to said centrex exchange for enabling said centrex exchange to establish and update said table means.

2. A telephone system in accordance with claim 1 wherein:
said centrex exchange includes recent change port means for receiving cable pair information;
and said station controller means communicates said cable pair information to said recent change port means.

3. A telephone system in accordance with claim 1 wherein:
said station controller means includes a further table means listing for each cable pair the cable pair information.

4. A telephone system in accordance with claim 1 wherein:
said station controller means couples the pick-up signal generated by each secondary station to said centrex exchange.

5. A telephone system in accordance with claim 1 wherein:
each primary station includes a lamp means for indicating the status of that primary station;
and said station controller means generates a signal for controlling the state of the lamp means in each primary station in dependence on the monitored status of the primary station.

6. A telephone system in accordance with claim 1 wherein:
said station controller means includes a plurality of station controller units each of which being associated with a number of said cable pairs and the telephone stations connected to said number of cable pairs, each station controller unit monitoring the status of each primary station included in its associated stations and each generating a signal for controlling the lamp means of each secondary station included in its associated stations of a pick-up group in dependence on the monitored status of the primary station of the pick-up group, each station controller, unit further monitoring for each cable pair associated with the station controller unit the cable pair information corresponding to the cable pair;
said station controller means further comprising: admistrative processing means responsive to said station controller units for establishing a further table means listing for each cable pair the corresponding cable pair information and for transmitting the entries in said further table to said centrex exchange;
and said system further comprising: local area network means for permitting communicaton amongst said station controller units and between each station controller unit and said administrative processing means.

7. A telephone system in accordance with claim 6 wherein:
each station controller unit for each cable pair associated with the station controller unit monitors the cable pair information corresponding to the cable pair and places the cable pair information on the local area network means;
and said administrative processing means is responsive to the cable pair information placed on the local area network means by each station controller unit and uses said cable pair information to establish and update said further table means.

8. A telephone system in accordance with claim 7 wherein:
the telephone stations in one or more of said pick-up groups are associated with a plurality of different station controller units;
each station controller unit places on the local area network means the status signal of each primary station of its associated stations which is in a pick-up group having one or more secondary stations not included in the associated stations of the controller unit;
and each station controller unit is responsive to each status signal on the local area network means which corresponds to a primary station of a multi-station pick-up group having one or more secondary stations included in the associated stations of the controller unit.

9. A telephone system in accordance with claim 8 wherein:

each station controller unit places on the local area network means the status signal of each primary station included in its associated stations.

10. A telephone system in accordance with claim 9 wherein:
each station controller unit couples the pick-up signal generated by each secondary station included in its associated stations to the centrex exchange.

11. A telephone system in accordance with claim 10 wherein:
each primary station includes a lamp means for indicating the status of the primary station;
and each station controller unit generates a signal for controlling the lamp means of each primary station included in its associated stations in dependence on the monitored status of the primary station.

12. A telephone system in accordance with claim 7 wherein:
each station controller unit couples voice channel and control channel information between the telephone stations included in its associated stations and the centrex exchange.

13. A telephone system in accordance with claim 12 wherein:
the voice channel and control channel information transmitted between each controller unit and its associated telephone stations is in digital message form and the voice channel and control channel information transmitted between each controller unit and the centrex exchange is in POTS signal form.

14. A telephone system in accordance with claim 7 wherein:
each station controller unit couples data channel information to and from one or more of the telephone stations included in its associated stations and the cable pair information of the cable pairs corresponding to said associated stations is included in said data channel information;
and each station controller unit couples data channel information to and from the local area network means.

15. A telephone system in accordance with claim 7 wherein:
said centrex exchange includes recent change port means for receiving cable pair information for establishing and updating said table means;
and said administrative processing means communicates cable pair information received from said station controller units over said local area network means to said recent change port means.

16. A telephone system in accordance with claim 15 further comprising:
buffer means disposed between said administrative processing means and said recent change port means.

17. A telephone system in accordance with claim 1 wherein:
the identification number of each telephone station is a directory number.

18. A station controller for use in a telephone system, the telephone system comprising: a plurality of telephone stations including one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group, each telephone station further having an identification number; a plurality of cable pairs, each cable pair being adapted to connect the telephone station connected to the cable pair to an associated equipment port on a centrex exchange; a centrex exchange for managing the flow of telephone calls to and from said telephone stations, said centrex exchange being responsive to the pick-up signal generated by each secondary station of a pick-up group and including means for transferring a call from a primary station in a pick-up group to a secondary station in the pick-up group in response to a pick-up signal from the secondary station, said centrex exchange further having a plurality of equipment ports each connected to an associated one of said cable pairs and table means within said centrex exchange for correlating each equipment port with the associated cable pair and with cable pair information corresponding to the associated cable pair, said cable pair information including the cable pair number, whether or not the associated cable pair is connected to a telephone station and, if so, the identification number of the telephone station; the station controller being adapted to be connected to said plurality of cable pairs and to be interposed between associated ones of the telephone stations and said centrex exchange and being unable to transfer calls between its associated stations, the station controller including:
means for monitoring the status of each primary station included in the associated stations and generating a status signal;
means for generating a signal for controlling the state of the lamp means in each secondary station included in the associated stations in dependence on the status of the primary station in the pick-up group of the secondary station;
and means for monitoring for each cable pair said cable pair information and adapted to communicate the monitored cable pair information to said centrex exchange for enabling said centrex exchange to establish and update said table means.

19. A station controller in accordance with claim 18 further comprising:
means responsive to a local area network circulating signals indicative of the status of one or more primary stations for reporting said status to said generating means.

20. A station controller in accordance with claim 18 wherein:
one or more secondary stations in said associated stations are in a pick-up group having a primary station which is not one of the primary stations included in said associated stations.

21. A station controller in accordance with claim 18 further comprising:
means for placing the cable pair information on a local area network which communicates with an administrative processor for providing the cable pair information to said centrex exchange.

22. A method of operating a telephone system comprising:
providing a plurality of telephone stations including: arranging the stations into one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group, each telephone station further having an identification number;

providing a plurality of cable pairs, each cable pair being used to connect the telephone station connected to the cable pair to an associated equipment port on a centrex exchange;

managing the flow of telephone calls to and from said telephone stations with said centrex exchange, said centrex exchange being responsive to the pick-up signal generated by each secondary station of a pick-up group and including means for transferring a call from a primary station in a pick-up group to a secondary station in the pick-up group in response to a pick-up signal from the secondary station, said centrex exchange further having a plurality of equipment ports each connected to an associated one of said cable pairs and table means within said centrex exchange for correlating each equipment port with the associated cable pair and with cable pair information corresponding to the associated cable pair, said cable pair information including the cable pair number, whether or not the associated cable pair is connected to a telephone station and, if so, the identification number of the telephone station;

and connecting a station controller means to said plurality of cable pairs and between said telephone stations and said centrex exchange, said station controller means monitoring the status of the primary station of each pick-up group and generating a signal for controlling the state of the lamp means in each of the secondary stations of the pick-up group in dependence on the monitored status of the primary station of the pick-up group, said station controller means further monitoring for each cable pair said cable pair information and communicating the monitored cable pair information to said centrex exchange for enabling said centrex exchange to establish and update said table means.

23. A method of operating a telephone system in accordance with claim 22 wherein:
said centrex exchange includes recent change port means for receiving cable pair information;
and said station controller means communicates said cable pair information to said recent change port means.

24. A method of operating a telephone system in accordance with claim 22 wherein:
said station controller means includes a further table means listing for each cable pair the associated equipment port and cable pair information.

25. A method of operating a telephone system in accordance with claim 22 wherein:
said station controller means couples the pick-up signal generated by each secondary station to said centrex exchange.

26. A method of operating a telephone system in accordance with claim 22 wherein:
each primary station includes a lamp means for indicating the status of that primary station;
and said station controller means generates a signal for controlling the state of the lamp means in each primary station in dependence on the monitored status of the primary station.

27. A method of operating a telephone system in accordance with claim 22 wherein:
said step of connecting said station controller means includes: providing a plurality of station controller units each of which being associated with a number of said cable pairs and the telephone stations connected to said number of cable pairs, each station controller unit monitoring the status of each primary station included in its associated stations and each generating a signal for controlling the lamp means of each secondary station included in its associated stations of a pick-up group in dependence on the monitored status of the primary station of the pick-up group, each station controller unit further monitoring for each cable pair associated with station controller unit the cable pair information corresponding to the cable pair;
said step of providing said station controller means further comprising: providing admistrative processing means responsive to said station controller units for establishing a further table means listing for each cable pair the corresponding cable pair information and for transmitting the entries in said further table to said centrex exchange;
and said method further comprising: providing a local area network means for permitting communicaton amongst said station controller units and between each station controller unit and said administrative processing means.

28. A method of operating a telephone system in accordance with claim 27 wherein:
each station controller unit for each cable pair associated with the station controller unit monitors the cable pair information corresponding to the cable pair and places the cable pair information on the local area network means;
and said administrative processing means is responsive to the cable pair information placed on the local area network means by each station controller unit and uses said cable pair information to establish and update said further table.

29. A method of operating a telephone system in accordance with claim 28 wherein:
the telephone stations in one or more of said pick-up groups are associated with a plurality of different ones of said plurality of station controller units;
each station controller unit places on the local area network means the status signal of each primary station of its associated stations which is in a pick-up group having one or more secondary stations not included in the associated stations of the controller unit;
and each station controller unit is responsive to each status signal on the local area network means which corresponds to a primary station of a multi-station pick-up group having one or more secondary stations included in the associated stations of the controller unit.

30. A method of operating a telephone system in accordance with claim 29 wherein:
each station controller unit places on the local area network means the status signal of each primary station included in its associated stations.

31. A method of operating a telephone system in accordance with claim 30 wherein:
each station controller unit couples the pick-up signal generated by each secondary station included in its associated stations to the centrex exchange.

32. A method of operating a telephone system in accordance with claim 31 wherein:
  each primary station includes a lamp means for indicating the status of the primary station;
  and each station controller unit generates a signal for controlling the state of the lamp means of each primary station included in its associated stations in dependence on the monitored status of the primary station.

33. A method of operating a telephone system in accordance with claim 27 wherein:
  each station controller unit couples voice channel and control channel information between the telephone stations included in its associated stations and the centrex exchange.

34. A method of operating a telephone system in accordance with claim 33 wherein:
  the voice channel and control channel information transmitted between each controller unit and its associated telephone stations is in digital message form and the voice channel and control channel information transmitted between each controller unit and the centrex exchange is in POTS signal form.

35. A method of operating telephone system in accordance with claim 27 wherein:
  each station controller unit couples data channel information to and from one or more of the telephone stations included in its associated stations and the cable pair information of the cable pairs corresponding to said associated stations is included in said data channel information;
  and each station controller unit couples data channel information to and from the local area network means.

36. A method of operating a telephone system in accordance with claim 27 wherein:
  said centrex exchange includes recent change port means for receiving cable pair information for establishing and updating said table means;
  and said administrative processing means communicates cable pair information received from said station controller units over said local area network means to said recent change port means.

37. A method of operating a telephone system in accordance with claim 36 further comprising:
  providing a buffer means between said administrative processing means and said recent change port means.

38. A method of operating a telephone system in accordance with claim 22 wherein:
  the identification number of each telephone station is directory number.

39. A method of operating a station controller for use in a telephone system, the telephone system comprising: a plurality of telephone stations including one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group, each telephone station further having an identification number; a plurality of cable pairs, each cable pair being adapted to connect the telephone station connected to the cable pair to an associated equipment port on a centrex exchange; a centrex exchange for managing the flow of telephone calls to and from said telephone stations, said centrex exchange being responsive to the pick-up signal generated by each secondary station of a pick-up group and including means for transferring a call from a primary station in a pick-up group to a secondary station in the pick-up group in response to a pick-up signal from the secondary station, said centrex exchange further having a plurality of equipment ports each connected to an associated one of said cable pairs and table means within said centrex exchange for correlating each equipment port with the associated cable pair and with cable pair information corresponding to the associated cable pair, said cable pair information including the cable pair number, whether or not the associated cable pair is connected to a telephone station and, if so, the identification number of the telephone station; the station controller being adapted to be connected to said plurality of cable pairs and to be interposed between associated ones of the telephone stations and said centrex exchange and being unable to transfer calls between its associated stations, the method including:
  monitoring the status of each primary station included in the associated stations and generating a status signal;
  generating a signal for controlling the state of the lamp means in each secondary station included in the associated stations in dependence on the status of the primary station in the pick-up group of the secondary station;
  and monitoring for each cable pair said cable pair information and communicating the monitored cable pair information to said centrex exchange for enabling said centrex exchange to establish and update said table means.

40. A method of operating a station controller in accordance with claim 39 further comprising:
  responding with said station controller to a local area network circulating signals indicative of the status of one or more of said primary stations.

41. A method of operating a station controller in accordance with claim 40 wherein:
  one or more secondary stations in said associated stations are in a pick-up group having a primary station which is not one of the primary stations included in said associated stations.

42. A method of operating a station controller in accordance with claim 40 further comprising:
  placing with said station controller the cable pair information on a local area network which communicates with an administrative processor for providing the cable pair information to said centrex exchange.

* * * * *

UNITED STATES PATENT AND TRADEMARK OFFICE
CERTIFICATE OF CORRECTION

PATENT NO. : 5,200,996
DATED : April 6, 1993
INVENTOR(S) : John D. Beierle

It is certified that error appears in the above-identified patent and that said Letters Patent is hereby corrected as shown below:

Col. 2, line 53.   Change "Their" to -- There --
     Col. 2, line 53.   Change "changes" to -- exchange --
     Col. 3, line 60.   Change "later" to -- latter --
     Col. 4, line 8.    Change "FIG. 1;" to -- FIG. 1B; --
     Col. 4, line 11.   Change "FIG. 1 and" to -- FIG. 1B; and --
     Col. 4, line 14.   Change "FIG. 1;" to -- FIG. 1B; --
     Col. 4, line 66.   Change "FIG. 1a" to -- FIG. 1B as --

Col. 9, line 52.   Change "microprocesor" to -- microprocessor --

Col. 10, line 54.  Change "stations" to -- station --
     Col. 10, line 56.  Change "were" to -- was --

Signed and Sealed this

Twenty-sixth Day of April, 1994

Attest:

BRUCE LEHMAN

Attesting Officer        Commissioner of Patents and Trademarks